United States Patent
Chopra et al.

(10) Patent No.: US 11,195,190 B2
(45) Date of Patent: Dec. 7, 2021

(54) ASSESSMENT STRUCTURE FOR PREDICTING REACTIONS TO SOURCE-CUSTOMIZED REMUNERATION VEHICLES

(71) Applicant: MASTERCARD INTERNATIONAL INCORPORATED, Purchase, NY (US)

(72) Inventors: Gautam Chopra, New Delhi (IN); Alan Gorenstein, Fairfield, CT (US); Andrew Dietrich, Stamford, CT (US); Daniel Harrison, Thornwood, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 239 days.

(21) Appl. No.: 16/189,886

(22) Filed: Nov. 13, 2018

(65) Prior Publication Data
US 2020/0151744 A1    May 14, 2020

(51) Int. Cl.
*G06Q 30/02* (2012.01)
*G06Q 40/02* (2012.01)
*G06F 9/451* (2018.01)

(52) U.S. Cl.
CPC ......... *G06Q 30/0202* (2013.01); *G06F 9/451* (2018.02); *G06Q 40/02* (2013.01)

(58) Field of Classification Search
CPC .............. G06F 17/18; G06Q 30/0202; G06Q 30/0283; G06Q 20/20; G06Q 30/0207; G06Q 30/0278; G06Q 30/0282; G06Q 30/0205; G06Q 10/087; G06Q 30/0215; G06Q 20/10; G06Q 20/227;
(Continued)

(56) References Cited

U.S. PATENT DOCUMENTS 9,619,831 B1 * 4/2017 Kumar ............ G06Q 20/20
2013/0339165 A1 * 12/2013 Calman .......... G06Q 20/405
705/16

(Continued)

OTHER PUBLICATIONS

Narayanaswami et al., Smarter Commerce, Sep. 1, 2014, IBM Journal of Research and Development, vol. 58, Issue: 5/6, pp. 1-5 (Year: 2014).*

*Primary Examiner* — Robert D Rines
(74) *Attorney, Agent, or Firm* — Michael Best & Friedrich LLP (57) ABSTRACT

An assessment structure for predicting reactions to source-customized remuneration vehicles. In one embodiment, the present disclosure includes a server including a communication interface, a memory, and an electronic processor. The electronic processor, when executing a source-customized remuneration vehicle recommendation procedure, is configured to retrieve procurement data from data storage server, associate the procurement data to remuneration vehicle features, perform OLS modeling techniques to determine a linkage between the remuneration vehicle features, GDV, and the procurement data, retrieve results of quantitative research, and generate a benchmark and assessment structure for predicting a recipient reaction to a source-customized remuneration vehicle based on the results of the quantitative research and a determination of the linkage between the remuneration vehicle features, GDV, and the procurement data.

20 Claims, 8 Drawing Sheets

(58) Field of Classification Search
CPC ........... G06Q 20/3221; G06Q 20/3224; G06Q 30/0238; G06Q 30/0233; G06Q 20/32; G06Q 20/382
See application file for complete search history.

(56) References Cited

U.S. PATENT DOCUMENTS

| | | | |
|---|---|---|---|
| 2014/0278897 A1* | 9/2014 | Grigg | G06Q 30/0233 705/14.33 |
| 2014/0279409 A1* | 9/2014 | Grigg | G06Q 40/00 705/39 |
| 2014/0279505 A1* | 9/2014 | Grigg | G06Q 20/227 705/44 |
| 2015/0149308 A1* | 5/2015 | Lin | G06Q 20/36 705/16 |
| 2016/0092858 A1* | 3/2016 | Giles | G06Q 30/0207 705/14.1 |
| 2016/0328698 A1* | 11/2016 | Kumaraguruparan | G06Q 20/202 |

* cited by examiner

| Onboarding (12 elements) | Loading Funds (17 elements) | Spending (12 elements) | Sending Money (6 elements) | |
|---|---|---|---|---|
| 1.1.A Sign up for your card in person | 2.1.A Load with direct deposit | 3.1.A Get an alert when a purchase is made | 4.1.A Send money to another person within your country | 5.1.A View your purchase history online or in the card's mobile app |
| 1.1.B Sign up for your card online | 2.1.B Load with a debit or credit card | 3.2.A Customize what types of purchases you receive an alert | 4.1.B Send money to another person outside of your country | 5.1.B Search and filter your purchase history online or in the card's mobile app |
| 1.1.C Sign up for your card through a mobile app | 2.1.C Load by transferring funds from another bank account | 3.2.B Customize the information you receive in purchase alerts | 4.2.A Only send money to people that have an account at the same financial institution | 5.1.C Receive insights about your spending with graphs and trends online |
| 1.2.A Submit your identification documents in person | 2.1.D Load cash onto your card | 3.3.A Load your card into a digital wallet and use it to make contactless purchases | 4.2.B Send money to anyone with a debit or prepaid card | 5.1.D Export your purchase history to another program |
| 1.2.B Submit your identification documents online | 2.1.E Deposit a check by taking a picture | 3.3.B Load your card into a digital wallet and use it to make in-app purchases | 4.2.C Send money to people that don't have a financial account | 5.2.A Set a budget across different categories |
| 1.2.C Submit your identification documents within the card's mobile app | 2.2.A Load your card at bank branch | 3.3.C Load your card into a digital wallet and use it to make purchases when shopping online | 4.3.A Receive alerts when you send money from your account to another person | 5.2.B Your card will recommend a budget based on your spending history |
| 1.3.A Activate your card by calling an automated response system | 2.2.B Load your card at an ATM | 3.4.A Load your card into a digital wallet on your phone | | 5.2.C Receive an alert when you are close to reaching budget limits |
| 1.3.B Activate your card through the online website | 2.2.C Load your card at a store | 3.4.B Load your card into a digital wallet on your smartwatch | | 5.3.A Create a savings goal and automatically move money into a separate "pocket" |
| 1.3.C Activate your card through the card's mobile app | 2.2.D Load your card from within the card's mobile app | 3.4.C Load your card into a digital wallet in your car's dashboard screen | | 5.4.A Check your balance by calling an automated system |
| 1.4.A Get your card immediately in person | 2.2.E Load your card in your account online | 3.4.D Load your card into a digital wallet in a home appliance | | 5.4.B Check your balance online |
| 1.4.B Get a virtual card number immediately | 2.2.F Load your card by using a virtual voice assistant | 3.5.A Authorize each online purchase with a one-time code sent via SMS | | 5.4.C Check your balance with your card's mobile app |
| 1.4.C Immediately load your card into a digital wallet | 2.2.G Load your card using a messaging service | 3.5.B Authorize each online purchase using your fingerprint/voice recognition | | 5.4.D Receive an alert after each purchase with your remaining balance |
| | 2.2.H Load your account by sending an SMS | | | 5.4.E View your balance in your digital wallet |
| | 2.3.A Card's website or mobile app allows you to search for locations to load cash onto your card | | | 5.4.F Remaining balance is included on your receipt after you make a purchase |
| | 2.4.A Receive an alert when funds are available to use | | | 5.4.G Check your balance by sending a message to your bank on a messaging service |
| | 2.4.B Receive an alert with updated balance when funds are loaded | | | 5.4.H Check your balance by asking a voice assistant |
| | 2.5.A Automatically load funds from an external account based on a balance limit | | | 5.4.I Check your balance by sending a phrase via SMS to your bank |
| | | | | 5.5.A Receive an alert once your balance falls below a certain amount you set |

FIG. 8

| Card Benefits | Account Management (8 elements) | Customer Service (6 elements) | Funds Out (3 elements) |
|---|---|---|---|
| 6.1.A You receive a brochure explaining the card's benefits | 7.1.A Access your account online | 8.1.A Contact customer service to notify them of suspected fraud | 9.1.A Card's website or mobile app searches for where you can withdraw cash |
| 6.1.B There is a section on the card's website and mobile app that describes your card benefits | 7.1.B Access your account using a mobile app | 8.2.A Customer service will notify you if they suspect a fraudulent transaction | 9.2.A Transfer money from your prepaid card to any external account you own |
| 6.1.C Receive messages based on your spending patterns that highlight relevant card features and benefits | 7.2.A Log in to your online account or mobile app with a password | 8.2.B Customer service will notify you if there is a blocked purchase | 9.3.A Receive an alert when money has been withdrawn from your card |
| 6.2.A Receive financial education tips | 7.2.B Log in to your online account or mobile app by using your fingerprint or voice recognition | 8.3.A You can call customer service | |
| 6.2.B Complete financial education tasks to earn prizes | 7.3.A Lock and unlock your account whenever you want | 8.3.B Contact customer service through a chat functionality on the website or mobile app | |
| | 7.4.A Receive a replacement card in the mail the next day via overnight shipping | 8.3.C Speak to a customer service representative at your local bank branch | |
| | 7.4.B Receive a replacement virtual card number that you use to make online and digital wallet purchases | | |
| | 7.5.A Select and reset your PIN online or through the card's mobile app | | |

ASSESSMENT STRUCTURE FOR PREDICTING REACTIONS TO SOURCE-CUSTOMIZED REMUNERATION VEHICLES

FIELD OF INVENTION

The present disclosure relates to a benchmark and assessment structure for a remuneration vehicle, and more specifically, the present disclosure relates to a benchmark and assessment structure for predicting reactions to a source-customized remuneration vehicle as well as generating source-customized remuneration vehicle recommendations.

BACKGROUND

Conventionally, a source of items or services works with a remuneration vehicle issuer to release a remuneration vehicle with features that are intended to meet the needs of the source's recipients. The features of the remuneration vehicle are also referred to as a "recipient reaction" because the features of the remuneration vehicle are the features experienced by the recipient while using the remuneration vehicle. However, creating a desirable/positive "recipient reaction" is a challenge for a source due to the wide variety of different features available for the remuneration vehicle and due to the inability to appreciate the "recipient reaction" until after the remuneration vehicle is launched.

SUMMARY

To solve the source's challenge of creating a desirable/positive "recipient reaction" in line with the source's initial expectations, a benchmark and assessment structure for predicting a recipient reaction (also referred to herein as "user experience" or "consumer experience") and generating source-customized remuneration vehicle recommendations based on source-specific procurement data is needed.

In one embodiment, the present disclosure includes a server. The server includes a communication interface, a memory, and an electronic processor communicatively connected to the memory and the communication interface. The communication interface is configured to communicate with a data storage server that stores procurement data and results of quantitative inquiries, the procurement data including source procurement data that is associated with a specific source of an item or service, and communicate with one or more source interface devices. The memory includes a source-customized remuneration vehicle recommendation procedure. The electronic processor, when executing the source-customized remuneration vehicle recommendation procedure, is configured to retrieve the procurement data from the data storage server, associate the procurement data that is retrieved to remuneration vehicle features, perform ordinary least squares (OLS) modeling techniques to determine a linkage between the remuneration vehicle features, gross development value (GDV), and the procurement data, the OLS modeling techniques including univariate and multivariate linear regressions, retrieve the results of the quantitative inquiries, generate a benchmark and assessment structure for predicting a recipient reaction to a source-customized remuneration vehicle based on the results of the quantitative inquiries that are retrieved and a determination of the linkage between the remuneration vehicle features, GDV, and the procurement data that is retrieved, retrieve the source procurement data that is associated with the specific source, and generate one or more remuneration vehicle recommendations, the one or more remuneration vehicle recommendations is based on the source procurement data that is retrieved and on the benchmark and assessment structure.

In another embodiment, the present disclosure includes a system. The system including a data storage server, one or more source interface devices, and a server. The server including a communication interface, a memory, and an electronic processor communicatively connected to the communication interface and the memory. The communication interface configured to communicate with the data storage server that stores procurement data and results of quantitative inquiries, the procurement data including source procurement data that is associated with a specific source of an item or service, and communicate with the one or more source interface devices. The memory includes a source-customized remuneration vehicle recommendation procedure. The electronic processor, when executing the source-customized remuneration vehicle recommendation procedure, is configured to retrieve the procurement data from the data storage server, associate the procurement data that is retrieved to remuneration vehicle features, perform ordinary least squares (OLS) modeling techniques to determine a linkage between the remuneration vehicle features, gross development value (GDV), and the procurement data, the OLS modeling techniques including univariate and multivariate linear regressions, retrieve the results of the quantitative inquiries, generate a benchmark and assessment structure for predicting a recipient reaction to a source-customized remuneration vehicle based on the results of the quantitative inquiries that are retrieved and a determination of the linkage between the remuneration vehicle features, GDV, and the procurement data that is retrieved, retrieve the source procurement data that is associated with the specific source, and generate one or more remuneration vehicle recommendations, the one or more remuneration vehicle recommendations is based on the source procurement data that is retrieved and the benchmark and assessment structure.

In yet another embodiment, the present disclosure includes a non-transitory computer-readable medium. The non-transitory computer-readable medium comprising instructions that, when executed by an electronic processor, causes the electronic processor to perform a set of operations. The set of operations includes retrieving procurement data from a data storage server. The set of operations includes associating the procurement data that is retrieved to remuneration vehicle features. The set of operations includes performing ordinary least squares (OLS) modeling techniques to determine a linkage between the remuneration vehicle features, gross development value (GDV), and the procurement data, the OLS modeling techniques including univariate and multivariate linear regressions. The set of operations includes retrieving results of quantitative inquiries. The set of operations includes generating a benchmark and assessment structure for predicting a recipient reaction to a source-customized remuneration vehicle based on the results of quantitative inquiries that is retrieved and a determination of the linkage between the remuneration vehicle features, GDV, and the procurement data that is retrieved. The set of operations includes retrieving source procurement data that is associated with a specific source. The set of operations also includes generating one or more remuneration vehicle recommendations, the one or more remuneration vehicle recommendations is based on the source procurement data that is retrieved and the benchmark and assessment structure.

Other aspects of the present disclosure will become apparent by consideration of the detailed description and accompanying drawings.

BRIEF DESCRIPTION OF THE DRAWINGS

FIGS. 8 and 9 are diagrams illustrating recipient experience categories of individual remuneration vehicle features.

DETAILED DESCRIPTION

One or more examples are described and illustrated in the following description and accompanying drawings. These examples are not limited to the specific details provided herein and may be modified in various ways. Furthermore, other examples may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not described herein. Furthermore, some examples described herein may include one or more electronic processors configured to perform the described functionality by executing instructions stored in a non-transitory computer-readable medium. Similarly, examples described herein may be implemented as non-transitory, computer-readable medium storing instructions executable by one or more electronic processors to perform the described functionality. Described functionality can be performed in a client-server environment, a cloud computing environment, a local-processing environment, or a combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Further, terms such as "first", "second", and "third" are used herein for purposes of description and are not intended to indicate or imply relative importance or significance.

Figure 1:
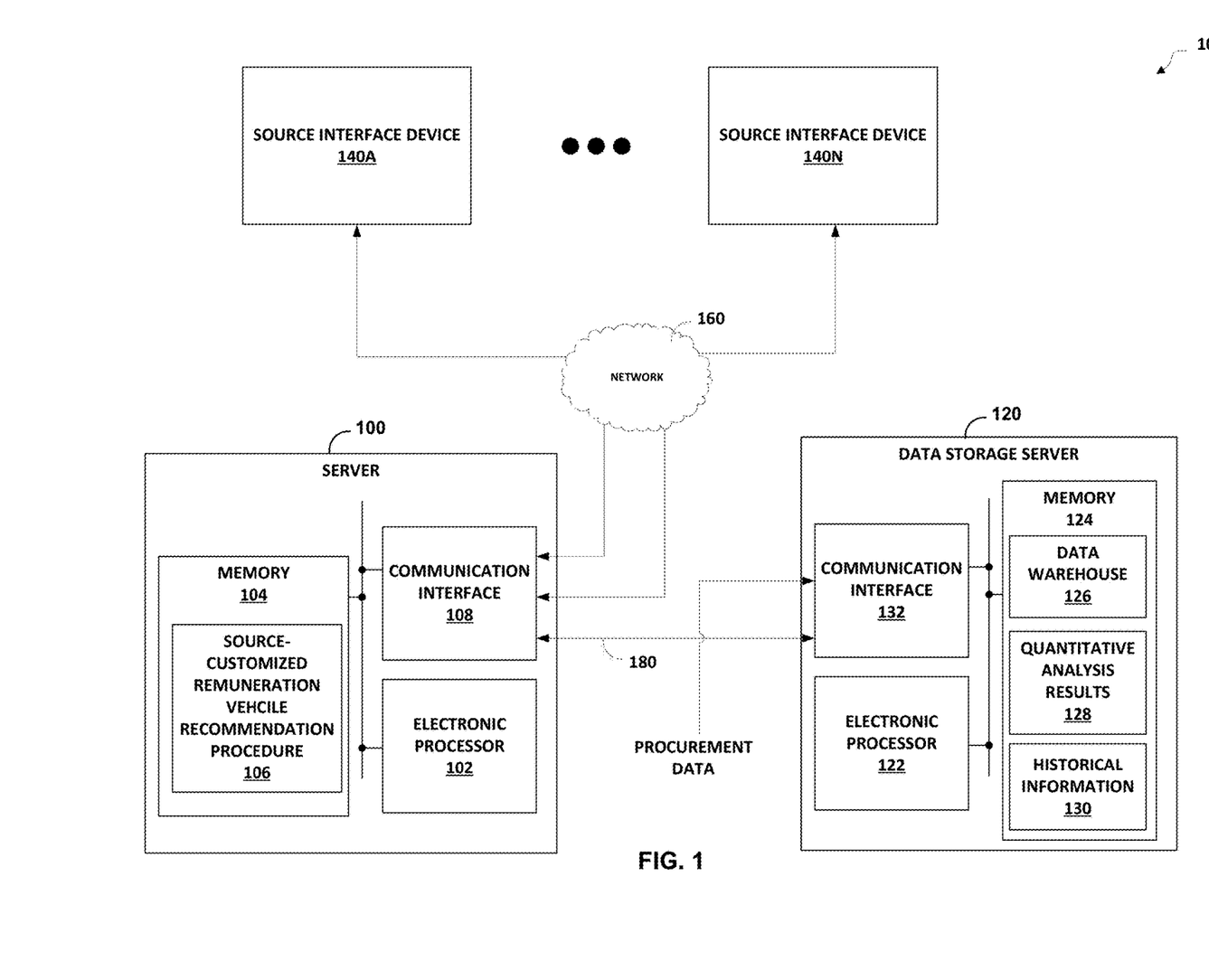
FIG. 1 is a block diagram illustrating a system including a source-customized remuneration vehicle recommendation procedure, in accordance with various aspects of the present disclosure.

As discussed above, creating a desirable/positive recipient reaction (e.g., a "user reaction" or a "consumer experience") of a remuneration vehicle is a challenge for a source of items or services because the source can select from a wide variety of different remuneration vehicle features and the source cannot appreciate the "recipient reaction" until after the remuneration vehicle is launched and experienced by the source's recipients (also referred to as "customers"). To solve this challenge, a system that generates a benchmark and assessment structure (also referred to as "framework") for predicting a "recipient reaction" of a remuneration vehicle and generating source-customized remuneration vehicle recommendations based on source-specific procurement data is needed. FIG. 1 is a block diagram illustrating a system including a source-customized remuneration vehicle recommendation procedure (also referred to as "program")106, in accordance with various aspects of the present disclosure.

In the example of FIG. 1, the system 10 includes a server 100, a data storage server 120, a plurality of source interface devices 140A-140N (also referred to as "merchant interface devices 140A-140N), and a network 160. The server 100 includes an electronic processor 102 (for example, a microprocessor or another suitable processing device), a memory 104 (for example, a non-transitory computer-readable storage medium), and a communication interface 108. It should be understood that, in some examples, the server 100 may include fewer or additional components in configurations different from that illustrated in FIG. 1. Also the server 100 may perform additional functionality than the functionality described herein. In addition, the functionality of the server 100 may be incorporated into other servers (e.g., distributed processing) or other suitable processing devices. As illustrated in FIG. 1, the electronic processor 102, the memory 104, and the communication interface 108 are electrically coupled by one or more control or data buses enabling communication between the components of the server 100.

The memory 104 may include a program storage area (for example, read only memory (ROM)) and a data storage area (for example, random access memory (RAM), and other non-transitory, machine-readable medium). In some examples, the program storage area may store the instructions regarding a source-customized remuneration vehicle recommendation program 106 as described in greater detail below.

The electronic processor 102 executes machine-readable instructions stored in the memory 104. For example, the electronic processor 102 may execute instructions of the merchant-customized payment product recommendation program 106 stored in the memory 104 to perform the functionality described herein.

The communication interface 108 receives data from, and provides data to, devices external to the server 100, such as the data storage server 120 via a backchannel 180 and the plurality of merchant interface devices 140A-140N via a network 160. For example, the communication interface 108 may include a port or connection for receiving a wired connection (for example, an Ethernet cable, fiber optic cable, a telephone cable, or the like), a wireless transceiver, or a combination thereof. The network 160 represents a wired or wireless connection between each of the plurality of merchant interface devices 140A-140N and the server 100. In some examples, the network 160 may be a personal area network (PAN), a local area network (LAN), a wireless local area network (WLAN), a wide area network (WAN), a virtual private network (VPN), or another suitable network.

In the example of FIG. 1, the data storage server 120 includes an electronic processor 122 (for example, a microprocessor or another suitable processing device), a memory 124 (for example, a non-transitory computer-readable storage medium), and a communication interface 132. It should be understood that, in some examples, the data storage server 120 may include fewer or additional components in configurations different from that illustrated in FIG. 1. Also, the data storage server 120 may perform additional functionality than the functionality described herein. In addition, the functionality of the data storage server 120 may be incorporated into other servers (e.g., distributed processing) or other suitable processing devices. As illustrated in FIG. 1, the electronic processor 122, the memory 124, and the communication interface 132 are electrically coupled by one or more control or data buses enabling communication between the components.

The memory 124 may include a program storage area (for example, read only memory (ROM)) and a data storage area (for example, random access memory (RAM), and other non-transitory, machine-readable medium). In some examples, the data storage area may store information regarding a data warehouse 126, quantitative analysis results 128, and historical information 130. In some examples, the data warehouse 126 is transaction data of a payment processing network and includes transaction data associated with a number of sources (also referred to as "merchants"). In some examples, the quantitative analysis results 128 are results from quantitative inquiries or research (e.g. existing or on-going consumer surveys). In some examples, the historical information 130 is information indicative of existing remuneration vehicles (also referred to as "existing payment products") in the marketplace.

The electronic processor 122 executes machine-readable instructions stored in the memory 124. For example, the electronic processor 122 may execute instructions stored in the memory 124 to perform the functionality described in greater detail below.

The communication interface 132 receives data from, and provides data to, devices external to the data storage server 120, such as the server 100. For example, the communication interface 132 may include a port or connection for receiving a wired connection (for example, an Ethernet cable, fiber optic cable, a telephone cable, or the like), a wireless transceiver, or a combination thereof. In the example of FIG. 1, the communication interface 132 is communicatively connected to the communication interface 108 via the backchannel 180 for collaboration and coordination of the server 100 and the data storage server 120. Additionally, in the example of FIG. 1, the communication interface 132 receives transaction data. For example, the transaction data is from a payment processing network (not shown). The transaction data is stored in the data warehouse 126 of the memory 124.

In some examples, the server 100 and the data storage server 120 may include one or more optional user interfaces (not shown). The one or more optional user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user, or a combination thereof. In some embodiments, as an alternative, or in addition, to managing inputs and outputs through the one or more optional user interfaces, the server 100 and the data storage server 120 may receive user input, provide user output, or both by communicating with an external device, such as a console computer, over a wired or wireless connection (for example, through the communication interfaces 108 and/or 132).

Each of the plurality of merchant interface devices 140A-140N may be, for example, a console computer or a mobile device that communicates with the server 100 via the network 160. Each of the plurality of merchant interface devices 140A-140N includes a display for displaying one or more graphical user interfaces that are generated by the server 100 as described in greater detail below. Each of the plurality of merchant interface devices 140A-140N accesses the server 100 outside of an enterprise network and outside of an enterprise firewall. In some examples, each of the plurality of merchant interface devices 140A-140N may be used by a merchant without administrator privileges to the server 100.

Figure 2:
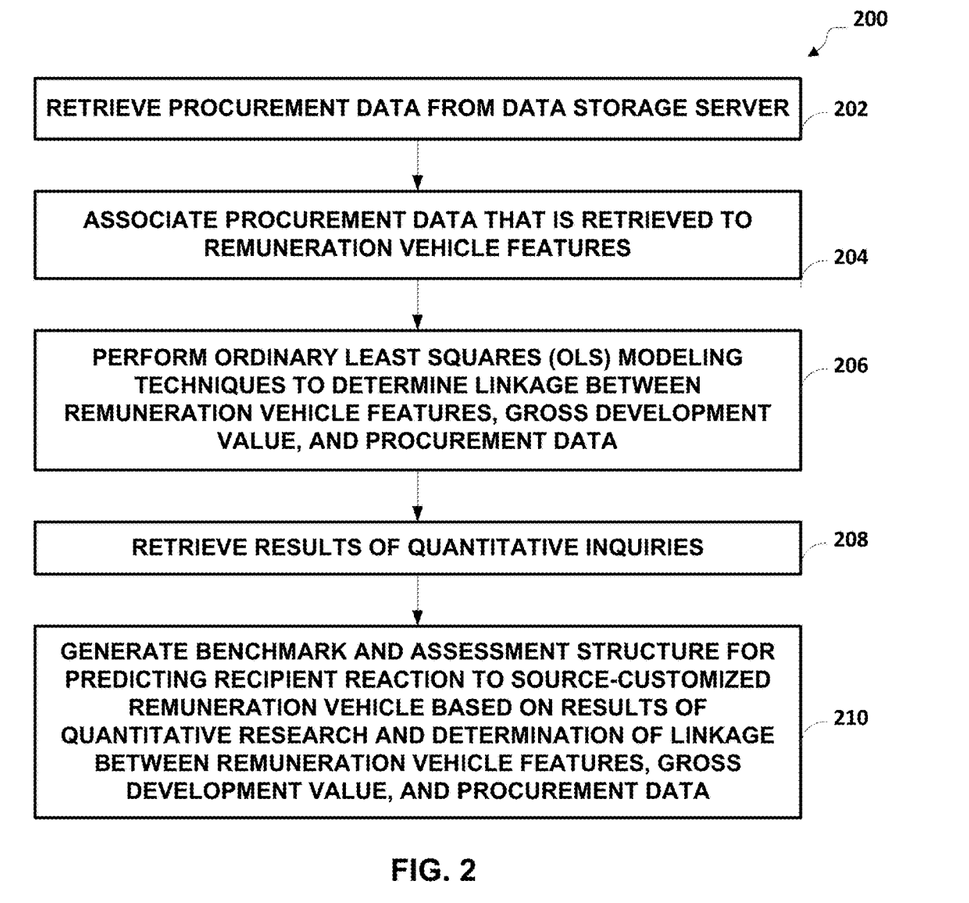
FIG. 2 is a flowchart illustrating a method for generating a benchmark and assessment structure for predicting a "recipient reaction" to a source-customized remuneration vehicle.

FIG. 2 is a flowchart illustrating a method 200 for generating a benchmark and assessment structure for predicting a "recipient reaction" of a source-customized remuneration vehicle. In some examples, the electronic processor 102 of the server 100 executes the source-customized remuneration vehicle recommendation program 106 to perform the method 200.

The method 200 includes the electronic processor 102 retrieving procurement data (also referred to as "transaction data") from the data storage server 120 (at block 202). For example, the electronic processor 102 transmits a request for the transaction data from the data storage server 120 via the communication interface 108, the backchannel 180, and the communication interface 132. The electronic processor 122 of the data storage server retrieves the transaction data that is requested from the data warehouse 126 of the memory 124 and transmits the transaction data that is requested to the electronic processor 102 via the communication interface 132, the backchannel 180, and the communication interface 108. The electronic processor 102 of the server 100 receives the transaction data that is requested from the data storage server 120.

The method 200 includes the electronic processor 102 associating (also referred to as "appending") the procurement data that is retrieved to remuneration vehicle features (also referred to as "payment product features") (at block 204). For example, the electronic processor 102 appends each datum of the requested transaction data to one of the ninety-one remuneration vehicle features illustrated and described in FIGS. 8 and 9 below.

The method 200 includes the electronic processor 102 performing ordinary least squares (OLS) modeling techniques to determine a linkage between the remuneration vehicle features, a gross development value (GDV), and the procurement data that is retrieved (at block 206). Additionally, in some examples, the method 200 includes the electronic processor 102 performing ordinary least squares (OLS) modeling techniques to determine a linkage between the remuneration vehicle features, a gross development value (GDV), Transaction Count, Average Ticket Size and other factors being split by nature of transaction, time of the month of the transaction (Weekday/Weekend), and the procurement data that is retrieved. The OLS modeling techniques include univariate and multivariate linear regressions.

The method 200 includes the electronic processor 102 retrieving the results of the quantitative inquiries (also referred to as "quantitative research") (at block 208). For example, the electronic processor 102 transmits a request for the quantitative analysis results from the data storage server 120 via the communication interface 108, the backchannel 180, and the communication interface 132. The electronic processor 122 of the data storage server retrieves the quantitative analysis results 128 stored in the memory 124 and transmits the quantitative analysis results 128 to the electronic processor 102 via the communication interface 132, the backchannel 180, and the communication interface 108. The electronic processor 102 of the server 100 receives the quantitative analysis results 128 from the data storage server 120. The quantitative analysis results 128 are results from quantitative research (for example, results from existing or on-going consumer surveys).

The method 200 includes the electronic processor 102 generating a benchmark and assessment structure for predicting a "recipient reaction" to a source-customized remuneration vehicle based on the results of the quantitative inquiries that are retrieved and a determination of the linkage between the remuneration vehicle features, GDV, and the procurement data (also referred to as "a benchmark and valuation framework for predicting a 'consumer experience' of a merchant-customized payment product") (at block 210). In some examples, the results of the quantitative research may be weighted at 75% and the OLS modeling techniques may be weighted at 25% in generating the benchmark and valuation structure.

In some examples, the method 200 may also include clustering the payment product features within a customer experience cycle before generating the benchmark and valuation framework. For example, a clustering algorithm is performed with an unsupervised learning approach to create groups of similar remuneration vehicle issuers and sources. A group based on performance is gauged based on transactional information and a custom developed algorithm that segments any set of sources and remuneration vehicle issuers across markets into cluster segments. The performance of the segments as gauged is similar within the group and different across the group comparison. The remuneration vehicle issuers falling within the same segment are a part of a list of competitors as determined from a transactional data perspective. The benchmark and assessment structure, as described above, further includes two benchmark scores. The first benchmark score is viewed by comparing the remuneration vehicle issuer within the same segment of its peer set. The other benchmark score is an overall benchmark score that considers all of the remuneration vehicle issuers together within a market.

In some examples, the list of competitors may be used to benchmark competitors against each other. For example, a first remuneration vehicle issuer and a second remuneration vehicle issuer falling within the same cluster may be considered competitors to each other, which will result in benchmarking the performance of the first remuneration vehicle issuer against with the performance of the second remuneration vehicle issuer. Additionally, a benchmarking report of benchmark and assessment structure may be executed on a market by market basis or as a provision that is executed at multiple markets combined together.

Figure 3:
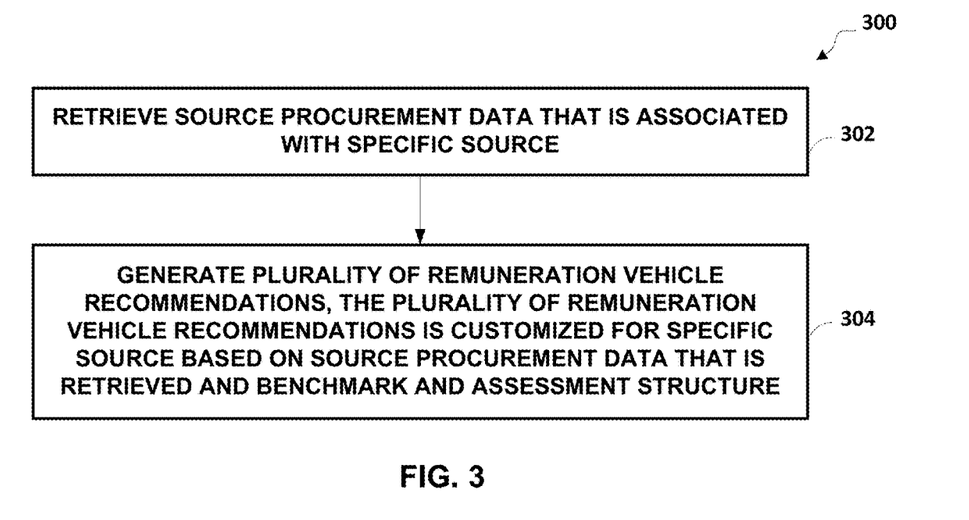
FIG. 3 is a flowchart illustrating a method for generating source-customized remuneration vehicle recommendations based on the benchmark and assessment structure of FIG. 2.

FIG. 3 is a flowchart illustrating a method 300 for generating source-customized remuneration vehicle recommendations based on the benchmark and assessment structure of FIG. 2. The electronic processor 102 of the server 100 executes the source-customized remuneration vehicle recommendation program 106 to perform the method 300. In some examples, the method 300 is an extension of the method 200.

The method 300 includes the electronic processor 102 retrieving source procurement data (also referred to as "merchant transaction data") that is associated with a specific source of goods or service (also referred to as "merchant")(at block 302). For example, the electronic processor 102 receives a recommendation request (e.g., a merchant's name received by the electronic processor 102 from a graphical user interface generated by the electronic processor 102) from a specific merchant with respect to a graphical user interface displayed on one of the plurality of the merchant interface devices 140A-140N, and the electronic processor 102 transmits a request for the transaction data associated with the specific merchant to the data storage server 120 via the communication 108, the backchannel 180, and the communication interface 132. The electronic processor 122 of the data storage server 120 retrieves the merchant transaction data that is requested from the data warehouse 126 of the memory 124 and transmits the merchant transaction data that is requested to the electronic processor 102 via the communication interface 132, the backchannel 180, and the communication interface 108. The electronic processor 102 of the server 100 receives the merchant transaction data that is requested from the data storage server 120.

The method 300 includes the electronic processor 102 generating one or more remuneration vehicle recommendations (also referred to as "payment product recommendations"), the one or more remuneration vehicle recommendations being based on the source procurement data that is retrieved and on the benchmark and assessment structure of FIG. 2 (at block 304).

In some examples, the method 300 may also include the electronic processor 102 generating one or more graphical user interfaces to display the one or more payment product recommendations on the one or more merchant interface devices. Additionally, in some examples, the electronic processor 102 receives a selection by the specific merchant of one of the one or more payment product recommendations displayed in the one or more graphical user interfaces and generates a second one or more graphical user interfaces (illustrated and described in greater detail below in FIGS. 4-7) based on the selection by the merchant. The second one or more graphical user interfaces illustrate various aspects of the "consumer experience" predicted by the benchmark and valuation structure of FIG. 2.

In other examples, the method 300 may also include the electronic processor 102 receiving a selection by the specific merchant of one of the one or more payment product recommendations displayed in the one or more graphical user interfaces and automatically selecting the "best" of the one or more payment product recommendations for the specific merchant and generating a second one or more graphical user interfaces (illustrated and described in greater detail below in FIGS. 4-7) based on the "best" selection.

In some examples, at least one of the one or more payment product recommendations includes a plurality of product features, as described in greater detail below with respect to FIGS. 8 and 9. In these examples, the method 300 may include the electronic processor 102 retrieving the historical information from the data storage server, and at least one product feature of the plurality of product features is not included in the historical information 130 for a specific merchant. In other words, the one or more payment product recommendations to a merchant includes at least one product feature that is included in the historical information for other merchants, and thus, is a new product feature for the merchant. Additionally, in these examples, the second one or more graphical user interfaces may further include an overall benchmark based on a comparison between the one or more payment product recommendations and a similar payment product from the historical information 130.

In some examples, the method 300 may include the electronic processor 102 receiving inputs from the specific merchant with respect a graphical user interface 700 as described below in FIG. 7, and changing one of the one or more payment product recommendations based on the inputs from the specific merchant.

Additionally, in these examples, to change the payment product recommendations based on the inputs from the specific merchant, the method 300 further includes the electronic processor 102 performing one of adding a first product feature to a payment product recommendation, or subtracting a second product feature from a payment product recommendation.

In some examples, each of the plurality of payment product features is part of one category selected from a group consisting of: an onboarding consumer experience category, a loading funds consumer experience category, a spending consumer experience category, a sending money consumer experience category, a tracking and budgeting consumer experience category, a marketing and education consumer experience category, an account management consumer experience category, a customer service consumer experience category, and a funds out consumer experience category.

In some examples, the specific merchant is an issuer of at least one of credit cards, debit cards, or prepaid cards. In other examples, the specific merchant is an entity involved in the trade or sale of goods or services.

Figure 4:
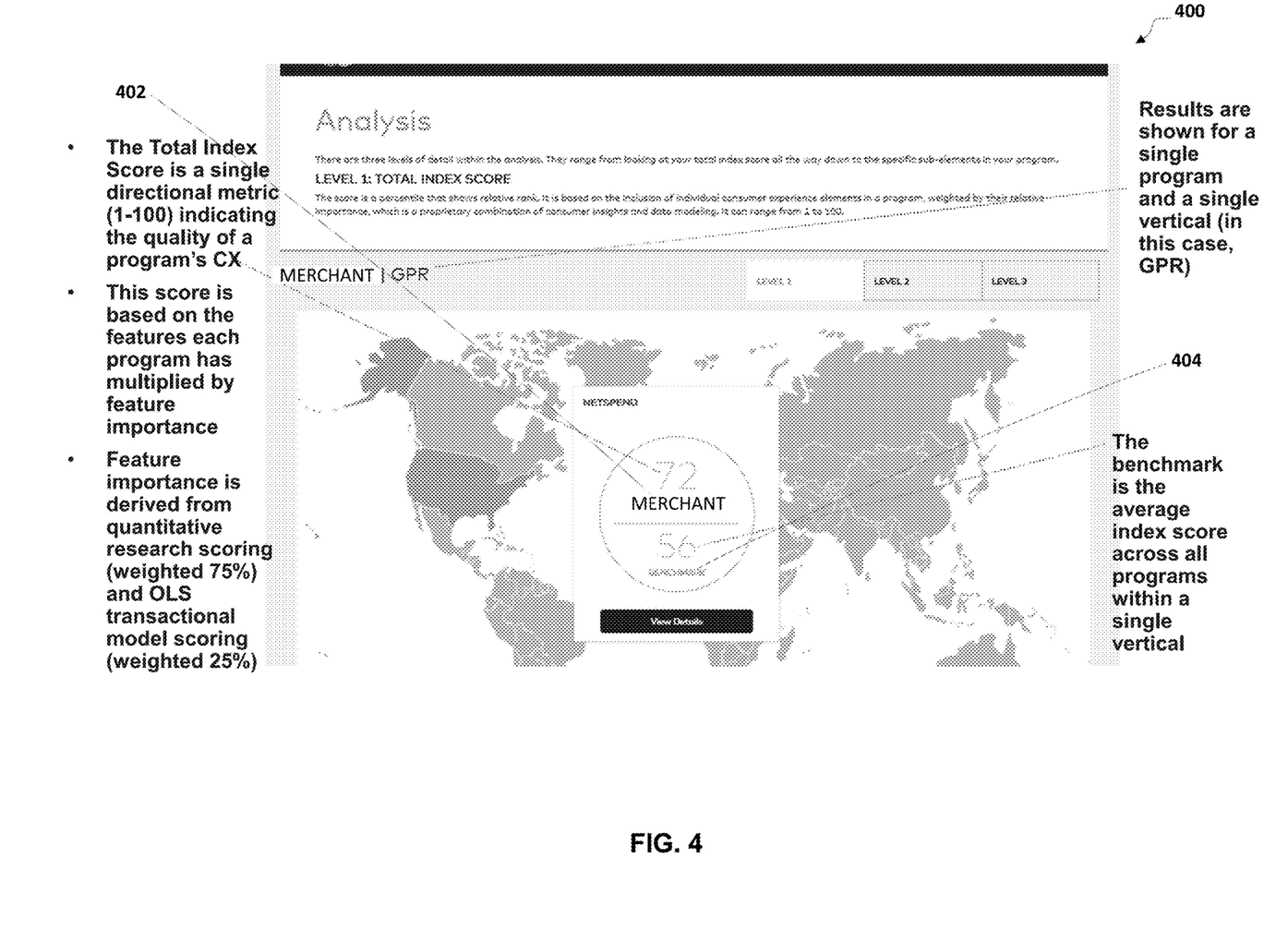
FIG. 4 is a diagram illustrating an example graphical user interface including a total index score and a corresponding benchmark.

FIG. 4 is a diagram illustrating an example graphical user interface 400 including a total index score 402 and a corresponding benchmark 404. The total index score 402 is a first level and single directional metric (e.g., 1-100) indicating the quality of a payment product's consumer experience for a single payment product program within a single vertical. The total index score 402 is based on the product features of a payment product multiplied by feature importance of the benchmark and valuation framework. The feature importance is derived from quantitative research scoring (e.g., the results of quantitative research described above, and in some examples, weighted 75%) and OLS transactional model scoring (e.g., the OLS modeling techniques described above, and in some examples, weighted 25%). Stated differently, the total index score 402 is based on the benchmark and assessment structure as described above in FIG. 2. In the example of FIG. 4, the total index score 402 is "72."

In the example of FIG. 4, the benchmark 404 is a single directional metric (e.g., 1-100) indicating the average quality of a payment product's consumer experience across all payment products within a single vertical. Further, like the total index score 402, the benchmark 404 is also based on the feature importance of the benchmark and assessment structure of FIG. 2. In the example of FIG. 4, the benchmark 404 that corresponds to the total index score 402 is "56."

Figure 5:
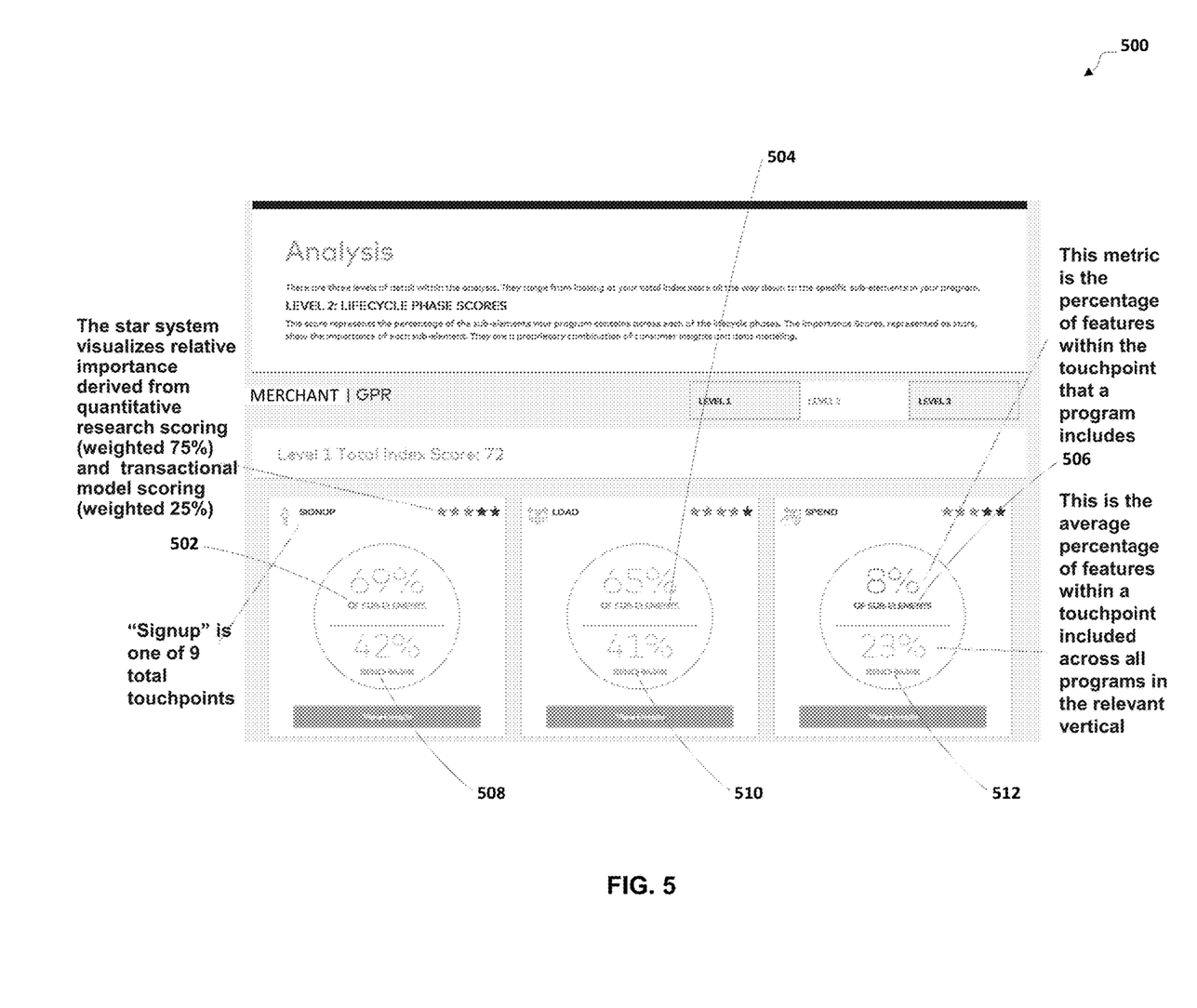
FIG. 5 is a diagram illustrating an example graphical user interface including lifecycle phase scores and corresponding benchmarks.

FIG. 5 is a diagram illustrating an example graphical user interface 500 including lifecycle phase scores 502-506 and corresponding benchmarks 508-512. In the example of FIG. 5, the lifecycle phase scores 502-506 is a percentage of the individual product features that are included in a merchant's payment product across each of the lifecycle phases. The lifecycle phase scores 502-506 are also based on the benchmark and assessment structure as described above in FIG. 2. In some examples, the graphical user interface 500 may also include corresponding importance scores (e.g., one to five stars) indicating the importance of each lifecycle phase.

Each of the benchmarks 508-512 is an average percentage of individual product features that are included across all payment product programs in a relevant vertical and correspond to lifecycle phase scores 502-506, respectively. The benchmarks 508-512 are based on the benchmark and assessment structure as described above in FIG. 2.

In the example of FIG. 5, the lifecycle phase score 502 for lifecycle phase "SIGNUP" is "69%" and the corresponding benchmark 508 is "42%." In the example of FIG. 5, the lifecycle phase "SIGNUP" also has an importance score of three out of five stars.

Further, in the example of FIG. 5, the lifecycle phase score 504 for lifecycle phase "LOAD" is "65%" and the corresponding benchmark 510 is "41%." In the example of FIG. 5, the lifecycle phase "LOAD" also has an importance score of four out of five stars.

Furthermore, in the example of FIG. 5, the lifecycle phase score 506 for lifecycle phase "SPEND" is "8%" and the corresponding benchmark 512 is "23%." In the example of FIG. 5, the lifecycle phase "SPEND" also has an importance score of three out of five stars.

Figure 6:
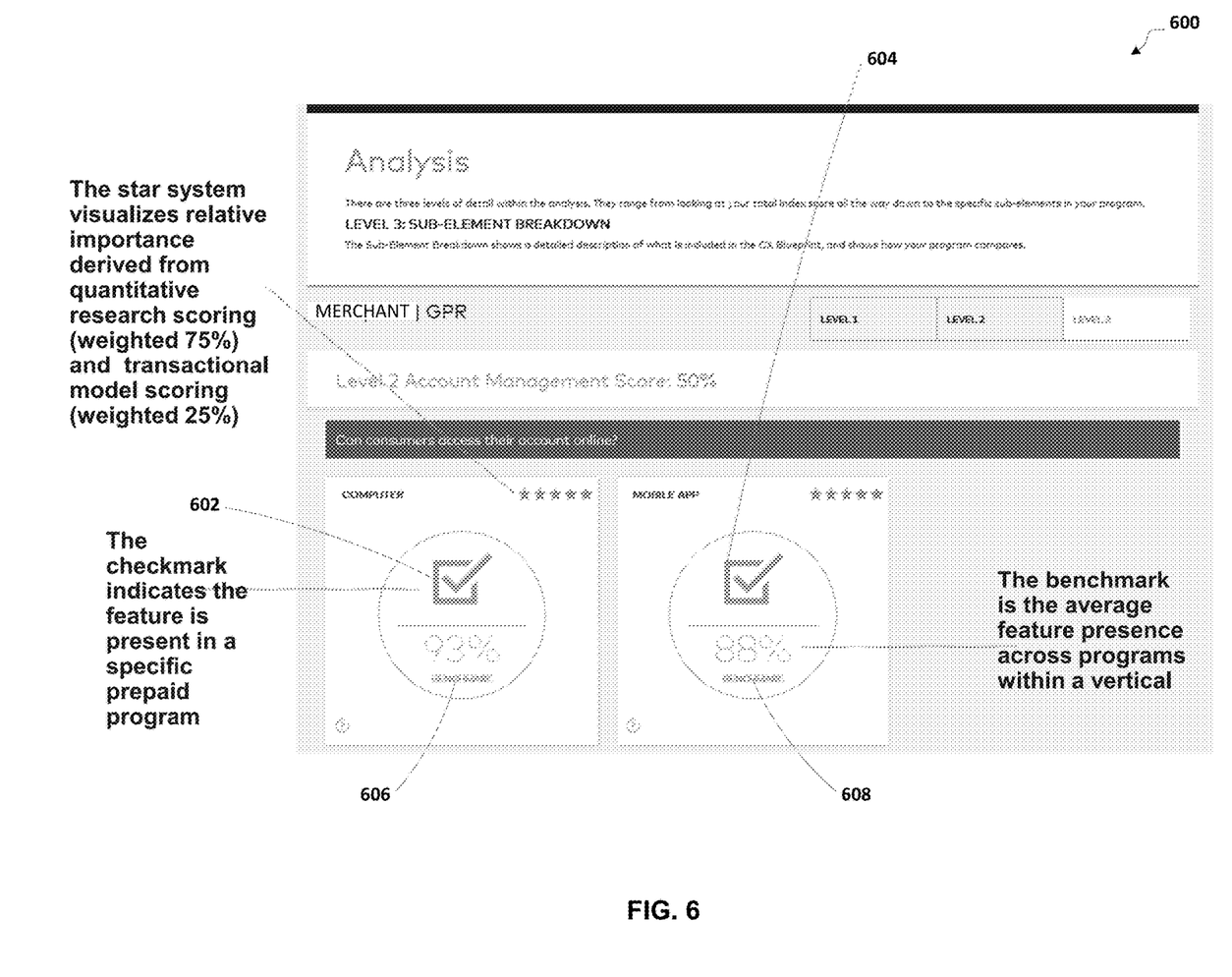
FIG. 6 is a diagram illustrating an example graphical user interface including sub-element breakdown indicators and corresponding benchmarks.

FIG. 6 is a diagram illustrating an example graphical user interface 600 including sub-element breakdown indicators 602 and 604 and corresponding benchmarks 606 and 608. The sub-element breakdown indicators 602 and 604 indicate whether the product feature is present in a specific payment product. In the example of FIG. 6, the sub-element breakdown indicators 602 and 604 are each a checkmark that indicates the feature is present in the merchant's payment product. In some examples, the graphical user interface 600 may also include corresponding importance scores (e.g., one to five stars) indicating the importance of each sub-element.

Each of the benchmarks 606 and 608 is an average percentage of the product feature presence across all programs within a vertical and correspond to sub-element breakdown indicators 602 and 604, respectively. The benchmarks 606 and 608 are part of the benchmark and assessment structure as described above in FIG. 2.

In the example of FIG. 6, the sub-element breakdown indicator 602 for sub-element "COMPUTER" is an affirmative green checkmark and the corresponding benchmark 606 is "93%." In the example of FIG. 6, the sub-element "COMPUTER" also has an importance score of five out of five stars.

Further, in the example of FIG. 6, the lifecycle phase score 604 for sub-element "MOBILE APP" is an affirmative green checkmark and the corresponding benchmark 608 is "88%." In the example of FIG. 6, the sub-element "MOBILE APP" also has an importance score of five out of five stars.

Figure 7:
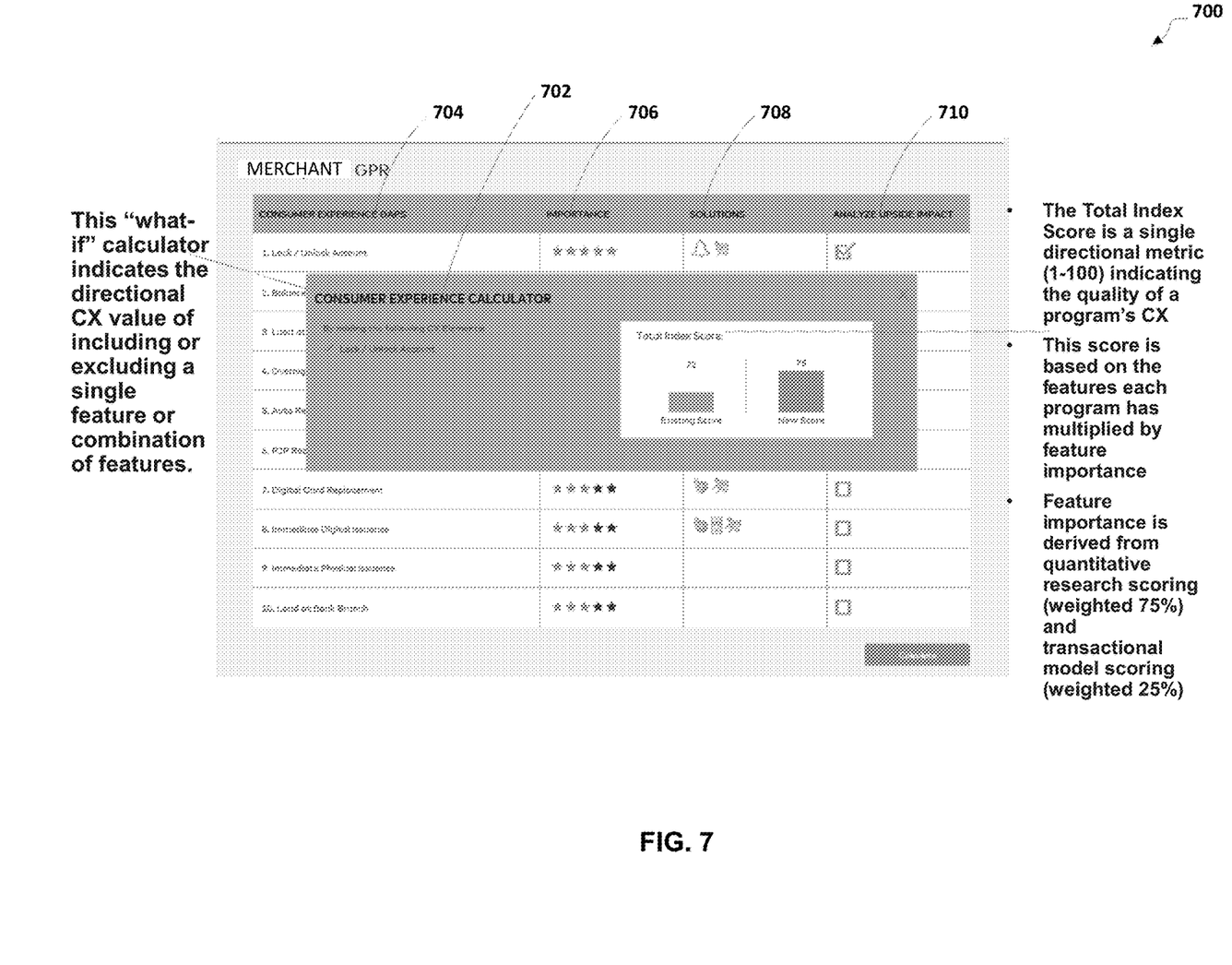
FIG. 7 is a diagram illustrating an example graphical user interface including a recipient reaction prediction calculator.

FIG. 7 is a diagram illustrating an example graphical user interface 700 including a recipient reaction prediction calculator 702. The recipient reaction prediction calculator 702 is a "what-if" calculator that predicts a new total index score by including or excluding a single product feature or a combination of product features as compared to the existing total index score, for example, the total index score 402 as described above in FIG. 4.

In some examples, the graphical user interface 700 may also include several components in addition to the recipient reaction prediction calculator 702, for example, a consumer experience gaps component 704, a solutions component 706, and an analyze upside impact component 710. The consumer experience gaps component 706 is a column of product feature descriptions.

The importance component 706 is a column of importance scores (e.g., one to five stars). Each of the importance scores indicates the importance of each corresponding product feature in the consumer experience gaps component 706. The importance scores of the importance component 706 is derived from quantitative research scoring and OLS transactional modeling scoring. In some examples, the quantitative research scoring is weighted 75% and the OLS transaction modeling scoring is weighted 25%.

The analyze upside impact component 710 is a column of checkboxes indicates whether the corresponding product feature in the consumer experience gaps component 706 and the corresponding importance score in the importance component 706 is included in the new total index score of the recipient reaction prediction calculator 702. Each of the checkboxes may be checked or unchecked by a merchant to add or remove, respectively, the product feature and the associated importance score from the new total index score.

In some examples, the analyze upside impact component 710 include pre-checked checkboxes based on a merchant's selection of one of the one or more payment product recommendations described above in FIG. 3. The pre-checked checkboxes represent a merchant-customized payment product recommendation based on the benchmark and valuation framework and the merchant's specific transaction data. In the example of FIG. 7, the analyze upside impact component 710 allows the merchant to further customize the merchant-customized payment product and further increase the total index score. The increase in the total index score is a predicted increase in the consumer experience associated with the merchant-customized payment product.

FIGS. 8 and 9 are diagrams illustrating recipient experience categories of individual remuneration vehicle features. Although the individual remuneration vehicle features are generally directed to a prepaid payment product, the individual remuneration vehicle features are equally applicable to other payment products including credit cards and debit cards. Further, the individual remuneration vehicle features taken into account by the benchmark and assessment structure are not limited to the individual remuneration vehicle features described below, but rather, represent one non-limiting example of the individual remuneration vehicle features.

FIG. 8 is a diagram illustrating recipient experience categories 800-808 (also referred to as "consumer experience categories 808-808"). Consumer experience category 800 is "ONBOARDING" with twelve individual payment product features. Consumer experience category 802 is "LOADING FUNDS" with seventeen individual payment product features. Consumer experience category 804 is "SPENDING" with twelve individual payment product features. Consumer experience category 806 is "SENDING MONEY" with six individual payment product features. Consumer experience category 808 is "ONBOARDING" with eighteen individual payment product features.

The twelve individual payment product features of the "ONBOARDING" consumer experience category 800 includes the following: 1) sign up for card in person, 2) sign up for card online, 3) sign up for card through mobile application, 4) submit identification documents in person, 5) submit identification documents online, 6) submit identification within the card's mobile application, 7) activate card by calling an automated response system, 8) activate card through online website, 9) activate card through the card's mobile application, 10) get card immediately in person, 11) get virtual card number immediately, and 12) immediately load card into a digital wallet.

The seventeen individual payment product features of "LOADING FUNDS" consumer experience category 802 includes the following: 1) load with direct deposit, 2) load with a debit or credit card, 3) load by transferring funds from another bank account, 4) load cash onto card, 5) deposit a check by taking a picture, 6) load card at bank branch, 7) load card at an ATM, 8) load card at a store, 9) load card from within the card's mobile application, 10) load card from account online, 11) load card using a virtual voice assistant, 12) load card using a messaging service, 13) load account by sending an SMS, 14) card's website or mobile application has a map to search for locations to load cash onto card, 15) receive an alert when funds are available to use, 16) receive an alert with updated balance when funds are loaded, and 17) automatically load funds from an external account based on a balance limit.

The twelve individual payment product features of the "SPENDING" consumer experience category 804 includes the following: 1) get an alert when a purchase is made, 2) customize what types of purchases trigger an alert, 3) customize the information in purchase alerts, 4) load card into digital wallet and use the digital wallet for contactless purchases, 5) load card into digital wallet and use the digital wallet to make in-app purchases, 6) load card into a digital wallet and use the digital wallet to make purchases when shopping online, 7) load card into a digital wallet on phone, 8) load card into digital wallet on smartwatch, 9) load card into a digital wallet on a car's dashboard screen, 10) load card into a digital wallet in a home appliance, 11) authorize each online purchase with a one-time code sent via SMS, and 12) authorize each online purchase using fingerprint/voice recognition.

The six individual payment product features of the "SENDING MONEY" consumer experience category 806 includes the following: 1) send money to another person within country, 2) send money to another person outside of country, 3) only send money to people that have an account at the same financial institution, 4) send money to anyone with a debit or a prepaid card, 5) send money to people that don't have a financial account, and 6) receive alerts when money is sent from account to another person.

The eighteen individual payment product features of "TRACKING AND BUDGETING" consumer experience category 808 includes the following: 1) view purchase history online or in the card's mobile application, 2) search and filter purchase history online or in the card's mobile application, 3) receive insights about spending with graphs and trends online, 4) export purchase history to another program, 5) set a budget across different categories, 6) card will recommend a budget based on spending history, 7) receive an alert when you are close to reaching budget limits, 8) create a savings goal and automatically move money into a separate "pocket," 9) check balance by calling an automated system, 10) check balance online, 11) check balance with card's mobile application, 12) receive an alert after each purchase with remaining balance, 13) view balance in digital wallet, 14) remaining balance is included on receipt after a purchase is made, 15) check balance by sending a message to bank via a messaging service, 16) check balance by asking a voice assistant, 17) check balance by sending a phrase via SMS to a bank, and 18) receive an alert once balance falls below a certain amount.

FIG. 9 is a diagram illustrating additional recipient experience categories 900-906 (also referred to as "consumer experience categories 900-906"). Consumer experience category 900 is "MARKETING AND EDUCATION" with five individual payment product features. Consumer experience category 902 is "ACCOUNT MANAGEMENT" with eight individual payment product features. Consumer experience category 904 is "CUSTOMER SERVICE" with six individual payment product features. Consumer experience category 906 is "FUNDS OUT" with three individual payment product features.

The five individual payment product features of the "MARKETING AND EDUCATION" consumer experience category 900 includes the following: 1) receive a brochure explaining the card's benefits, 2) a section of the card's website and mobile application that describes the card's benefits, 3) receive messages based on spending patterns that highlight relevant card features and benefits, 4) receive financial education tips, and 5) complete financial education tasks to earn prizes.

The eight individual payment product features of "ACCOUNT MANAGEMENT" consumer experience category 902 includes the following: 1) access account online, 2) access account using a mobile application, 3) log in to online account or mobile application with a password, 4) log in to online account or mobile application by fingerprint or voice recognition, 5) lock or unlock account at will, 6) receive replacement card in the mail the next day via overnight shipping, 7) receive a replacement virtual card number that is used to make online and digital wallet purchases, and 8) select and reset PIN online or through the card's mobile application.

The six individual payment product features of the "CUSTOMER SERVICE" consumer experience category 904 includes the following: 1) contact customer service to notify them of suspected fraud, 2) customer service will notify you if a fraudulent transaction is suspected, 3) customer service will initiate a notification if there is a blocked purchase, 4) customer service available by phone, 5) contact customer service through a chat functionality on the website or the mobile application, and 6) speak to a customer service representative at local bank branch.

The three individual payment product features of the "FUNDS OUT" consumer experience category 906 includes the following: 1) card's website or mobile application searches for where cash can be withdrawn, 2) transfer money from prepaid card to any commonly-owned external account, and 3) receive an alert when money has been withdrawn from card.

Additionally, in view of the foregoing, the source-customized remuneration vehicle program 106 learns (e.g., machine learning) from consumer experiences associated with existing payment products (i.e., the historical information 130) as well as on-going merchant-customized payment products. The source-customized remuneration vehicle program 106 adjusts the benchmark and assessment structure that is described above to re-align the benchmark and assessment structure with the consumer experience of the on-going source-customized remuneration vehicles.

Machine learning generally refers to the ability of a computer program to learn without being explicitly programmed. In some examples, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, unsupervised learning (e.g., clustering as discussed above), Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

Accordingly, the present disclosure provides, among other things, a new and useful assessment structure for predicting a recipient reaction to a source-customized remuneration vehicle. Various features and advantages of the present disclosure are set forth in the following claims.

What is claimed is:

1. A server comprising:
 a communication interface configured to
  communicate with a data storage server that stores procurement data and results of quantitative inquiries, the procurement data including source procurement data that is associated with a specific source of an item or service, and
  communicate with one or more source interface devices;
 a memory including a source-customized remuneration vehicle recommendation procedure; and
 an electronic processor communicatively connected to the memory and the communication interface, the electronic processor, when executing the source-customized remuneration vehicle recommendation procedure, is configured to
  retrieve the procurement data from the data storage server,
  associate the procurement data that is retrieved to remuneration vehicle features,
  perform ordinary least squares (OLS) modeling techniques to determine a linkage between the remuneration vehicle features, gross development value (GDV), and the procurement data, the OLS modeling techniques including univariate and multivariate linear regressions,
  retrieve the results of the quantitative inquiries,
  generate a benchmark and assessment structure for predicting a recipient reaction to a source-customized remuneration vehicle based on the results of the quantitative inquiries that are retrieved and a determination of the linkage between the remuneration vehicle features, GDV, and the procurement data that is retrieved,
  retrieve the source procurement data that is associated with the specific source,
  generate one or more remuneration vehicle recommendations, the one or more remuneration vehicle recommendations based on the source procurement data that is retrieved and on the benchmark and assessment structure,
  cluster the remuneration vehicle features within a user experience cycle, responsive to generating the one or more remuneration vehicle recommendations and clustering the remuneration vehicle features, generate one or more graphical user interfaces, wherein the electronic processor generates one or more selectable graphical elements representing lifecycle phase scores of the source-customized remuneration vehicle on the one or more source interface devices, receive a first input from the specific source at the one or more selectable graphical elements that selects one of the lifecycle phase scores, responsive to receiving the first input, generate one or more subset graphical user interfaces to actively display features of the one of the lifecycle phase scores that is selected, the features of the one of the lifecycle phase scores that is selected are based on the one or more remuneration vehicle recommendations and include selected features and unselected features, receive one or more inputs from the specific source that change one or more features of at least one of the selected features or the unselected features, and responsive to receiving the one or more inputs, update the one of the lifecycle phase scores in the one or more graphical user interfaces based on the change in the at least one of the selected features or the unselected features.

2. The server of claim 1, wherein the data storage server further includes historical information indicative of existing remuneration vehicles, wherein the electronic processor, when executing the source-customized remuneration vehicle recommendation procedure, is further configured to retrieve the historical information from the data storage server, wherein at least one of the one or more remuneration vehicle recommendations includes a plurality of product features, and wherein at least one product feature of the plurality of product features is not included in the historical information of the specific source.

3. The server of claim 2, wherein the one or more graphical user interfaces further includes an overall benchmark based on a comparison between the one or more remuneration vehicle recommendations and a similar remuneration vehicle from the historical information.

4. The server of claim 3, wherein the electronic processor, when executing the source-customized remuneration vehicle recommendation procedure, is further configured to receive inputs from the specific source with respect to the one or more graphical user interfaces, and change one of the one or more remuneration vehicle recommendations based on the inputs from the specific source.

5. The server of claim 4, wherein, to change the one or more of the one or more remuneration vehicle recommendations based on the inputs from the specific source, the electronic processor is further configured to perform one of:

adding a first product feature to the one of the one or more remuneration vehicle recommendations, or subtracting a second product feature from the one of the one or more remuneration vehicle recommendations.

6. The server of claim 1, wherein each of the one or more remuneration vehicle recommendations includes a different group from a plurality of remuneration vehicle features.

7. The server of claim 6, wherein each of the plurality of remuneration vehicle features is part of one category selected from a group consisting of:

an onboarding user experience category,
a loading funds user experience category,
a spending user experience category,
a sending money user experience category,
a tracking and budgeting user experience category,
a marketing and education user experience category,
an account management user experience category,
a customer service user experience category, and
a funds out user experience category.

8. The server of claim 1, wherein the specific source is an issuer of at least one of credit cards, debit cards, or prepaid cards.

9. The server of claim 1, wherein the electronic processor is further configured to perform machine learning on historical information indicative of existing remuneration vehicles and on on-going source-customized products to determine consumer experiences, and adjust the benchmark and assessment structure to re-align the benchmark and assessment structure based on the consumer experiences that are determined from the machine learning that is performed.

10. A system comprising:
a data storage server;
one or more source interface devices; and
a server including
a communication interface configured to
communicate with the data storage server that stores procurement data and results of quantitative inquiries, the procurement data including source procurement data that is associated with a specific source of an item or service, and
communicate with the one or more source interface devices;
a memory including a source-customized remuneration vehicle recommendation procedure; and
an electronic processor communicatively connected to the memory and the communication interface, the electronic processor, when executing the source-customized remuneration vehicle recommendation procedure, is configured to
retrieve the procurement data from the data storage server,
associate the procurement data that is retrieved to remuneration vehicle features,
perform ordinary least squares (OLS) modeling techniques to determine a linkage between the remuneration vehicle features, gross development value (GDV), and the procurement data, the OLS modeling techniques including univariate and multivariate linear regressions,
retrieve the results of the quantitative inquiries,
generate a benchmark and assessment structure for predicting a recipient reaction to a source-customized remuneration vehicle based on the results of the quantitative inquiries that are retrieved and a determination of the linkage between the remuneration vehicle features, GDV, and the procurement data that is retrieved,
retrieve the source procurement data that is associated with the specific source,
generate one or more remuneration vehicle recommendations, the one or more remuneration vehicle recommendations based on the source procurement data that is retrieved and the benchmark and assessment structure, cluster the remuneration vehicle features within a user experience cycle, responsive to generating the one or more remuneration vehicle recommendations and clustering the remuneration vehicle features, generate one or more graphical user interfaces, wherein the electronic processor generates one or more selectable graphical elements representing lifecycle phase scores of the source-customized remuneration vehicle on the one or more source interface devices, receive a first input from the specific source at the one or more selectable graphical elements that selects one of the lifecycle phase scores, responsive to receiving the first input, generate one or more subset graphical user interfaces to actively display features of the one of the lifecycle phase scores that is selected, the features of the one of the lifecycle phase scores that is selected are based on the one or more remuneration vehicle recommendations and include selected features and unselected features, receive one or more inputs from the specific source that change one or more features of at least one of the selected features or the unselected features, and responsive to receiving the one or more inputs, update the one of the lifecycle phase scores in the one or more graphical user interfaces based on the change in the at least one of the selected features or the unselected features.

11. The system of claim 10, wherein the data storage server further includes historical information indicative of existing remuneration vehicles, wherein the electronic processor, when executing the source-customized remuneration vehicle recommendation procedure, is further configured to retrieve the historical information from the data storage server, wherein at least one of the one or more remuneration vehicle recommendations includes a plurality of product features, and wherein at least one product feature of the plurality of product features is not included in the historical information of the specific source.

12. The system of claim 11, wherein the one or more graphical user interfaces further includes an overall benchmark based on a comparison between the one or more remuneration vehicle recommendations and a similar remuneration vehicle from the historical information.

13. The system of claim 12, wherein the electronic processor, when executing the source-customized remuneration vehicle recommendation procedure, is further configured to receive inputs from the specific source with respect to the one or more graphical user interfaces, and change one of the one or more remuneration vehicle recommendations based on the inputs from the specific source.

14. The system of claim 13, wherein, to change the one or more of the one or more remuneration vehicle recommendations based on the inputs from the specific source, the electronic processor is further configured to perform one of:

adding a first product feature to the one of the one or more remuneration vehicle recommendations, or subtracting a second product feature from the one of the one or more remuneration vehicle recommendations.

15. The system of claim 10, wherein each of the one or more remuneration vehicle recommendations includes a different group from a plurality of remuneration vehicle features.

16. The system of claim 15, wherein each of the plurality of remuneration vehicle features is part of one category selected from a group consisting of:

an onboarding user experience category,
a loading funds user experience category,
a spending user experience category,
a sending money user experience category,
a tracking and budgeting user experience category,
a marketing and education user experience category,
an account management user experience category,
a customer service user experience category, and
a funds out user experience category.

17. The system of claim 10, wherein the specific source is an issuer of at least one of credit cards, debit cards, or prepaid cards.

18. The system of claim 10, wherein the electronic processor is further configured to perform machine learning on historical information indicative of existing remuneration vehicles and on on-going source-customized products to determine consumer experiences, and adjust the benchmark and assessment structure to re-align the benchmark and assessment structure based on the consumer experiences that are determined from the machine learning that is performed.

19. A non-transitory computer-readable medium comprising instructions that, when executed by an electronic processor, causes the electronic processor to perform a set of operations, the set of operations comprising:

retrieving procurement data from a data storage server;

associating the procurement data that is retrieved to remuneration vehicle features;

performing ordinary least squares (OLS) modeling techniques to determine a linkage between the remuneration vehicle features, gross development value (GDV), and the procurement data, the OLS modeling techniques including univariate and multivariate linear regressions;

retrieving results of quantitative inquiries;

generating a benchmark and assessment structure for predicting a recipient reaction to a source-customized remuneration vehicle based on the results of quantitative inquiries that is retrieved and a determination of the linkage between the remuneration vehicle features, GDV, and the procurement data that is retrieved;

retrieving source procurement data that is associated with a specific source;

generating one or more remuneration vehicle recommendations, the one or more remuneration vehicle recommendations based on the source procurement data that is retrieved and the benchmark and assessment structure;

clustering the remuneration vehicle features within a user experience cycle;

generating one or more graphical user interfaces, wherein the electronic processor generates one or more selectable graphical elements representing lifecycle phase scores of the source-customized remuneration vehicle on one or more source interface devices in response to generating the one or more remuneration vehicle recommendations and clustering the remuneration vehicle features;

receiving a first input from the specific source at the one or more selectable graphical elements that selects one of the lifecycle phase scores;

responsive to receiving the first input, generating one or more subset graphical user interfaces to actively display features of the one of the lifecycle phase scores that is selected, the features of the one of the lifecycle phase scores that is selected are based on the one or more remuneration vehicle recommendations and include selected features and unselected features;

receiving one or more inputs from the specific source that change one or more features of at least one of the selected features or the unselected features; and updating the one of the lifecycle phase scores in the one or more graphical user interfaces based on the change in the at least one of the selected features or the unselected features in response to receiving the one or more inputs.

20. The non-transitory computer-readable medium of claim 19, wherein the set of operations further includes performing machine learning on historical information and on on-going source-customized products to determine consumer experiences; and adjusting the benchmark and assessment structure to re-align the benchmark and assessment structure based on the consumer experiences that are determined from the machine learning that is performed.

* * * * *